United States Patent [19]
Van Lente

[11] Patent Number: 5,406,270
[45] Date of Patent: Apr. 11, 1995

[54] DEAD SWITCH VEHICLE OPERATOR IDENTIFICATION

[75] Inventor: Paul S. Van Lente, Holland, Mich.

[73] Assignee: Prince Corporation, Holland, Mich.

[21] Appl. No.: 271,234

[22] Filed: Jul. 6, 1994

Related U.S. Application Data

[63] Continuation of Ser. No. 904,599, Jun. 29, 1992, abandoned.

[51] Int. Cl.⁶ .................... B60L 1/00; H01H 47/00; F02P 9/00
[52] U.S. Cl. .................... 340/825.34; 340/825.31; 307/10.1; 307/10.5; 307/10.6
[58] Field of Search .................... 340/825.34, 825.31, 340/426, 825.32; 307/10.1, 10.5, 10.6, 10.2, 10.3, 10.4; 364/424.05, 426

[56] References Cited

U.S. PATENT DOCUMENTS

| | | |
|---|---|---|
| 4,204,255 | 5/1980 | Cremer . |
| 4,267,494 | 5/1981 | Matsuoka et al. . |
| 4,404,632 | 9/1983 | Harada et al. . |
| 4,434,468 | 2/1984 | Caddick et al. . |
| 4,451,887 | 5/1984 | Harada et al. . |
| 4,463,426 | 7/1984 | Caddick et al. . |
| 4,477,874 | 10/1984 | Ikuta et al. . |
| 4,638,292 | 1/1987 | Mochida et al. ............ 340/426 |
| 4,660,140 | 4/1987 | Illg . |
| 4,706,194 | 11/1987 | Webb et al. . |
| 4,742,327 | 5/1988 | Burgess et al. ............ 340/426 |
| 4,754,255 | 6/1988 | Sanders et al. . |
| 4,788,447 | 11/1988 | Kiyono et al. ............ 307/10.1 |
| 4,796,151 | 1/1989 | Asada et al. ............ 361/171 |
| 4,797,824 | 1/1989 | Sugiyama et al. . |
| 4,811,226 | 3/1989 | Shinohara . |
| 4,845,620 | 7/1989 | Parker . |
| 4,853,687 | 8/1989 | Isomura et al. . |
| 4,907,153 | 3/1990 | Brodsky . |
| 4,920,338 | 4/1990 | Tsunoda et al. ............ 340/825.30 |
| 5,060,263 | 10/1991 | Bosen et al. ............ 380/25 |
| 5,097,506 | 3/1992 | Kaiser et al. ............ 380/25 |
| 5,113,182 | 5/1992 | Suman et al. . |
| 5,113,442 | 5/1992 | Moir ............ 380/25 |
| 5,180,924 | 1/1993 | Rudisel ............ 307/10.6 |
| 5,187,381 | 2/1993 | Iwasa et al. ............ 307/10.1 |
| 5,278,547 | 1/1994 | Suman et al. ............ 340/825.32 |

Primary Examiner—Donald J. Yusko
Assistant Examiner—David Jung
Attorney, Agent, or Firm—Price Heneveld Cooper DeWitt & Litton

[57] ABSTRACT

An operator identification system utilizes "dead" switches, such as window actuating switches which have no control function until such time as a vehicle ignition is turned on, for identifying a particular vehicle operator. The inactive switch contact closure is detected by an electrical circuit which also tests to determine whether the ignition is off and if it is, the window switch closure provides an operator identification signal to a vehicle microprocessor for identifying a particular driver and preset option functions associated with that driver.

14 Claims, 2 Drawing Sheets

DEAD SWITCH VEHICLE OPERATOR IDENTIFICATION

This is a continuation of application 07/904,509, filed on Jun. 29, 1992, now abandoned.

BACKGROUND OF THE INVENTION

The present invention pertains to vehicle electrical control systems and particularly to a system using existing switches to perform a dual function for the identification of a vehicle operator to a vehicle microprocessor system for the selection of operator dependent preset options.

There exists a variety of manners in which vehicle operators are identified in modern vehicles containing somewhat sophisticated electrical systems in which preset options such as seat position, rearview mirror adjustment position and the like are preset for a particular driver. Initially this was achieved by driver A, driver B switches, which were separate switches dedicated to the identification of a particular driver. With this system, when a driver enters a vehicle, he or she would activate the appropriate identification switch to effectuate options selected by that particular driver. With the popularity of keyless entry systems, a code transmitted by a transmitter for a particular vehicle operator included an identification code for the particular operator such that upon receipt of the code the preset options can be set as the vehicle is unlocked using the keyless entry transmitter. U.S. Pat. No. 5,113,182 discloses such a system.

With the downsizing of vehicles and the increasing control functions available for vehicle electronic systems installed in modern vehicles, the control of such vehicle options is becoming increasingly complicated and the addition of separate switches for vehicle operator identification in vehicle's which do not include a somewhat more sophisticated keyless entry system is undesirable. Accordingly, there exists a need for vehicle operators to identify themselves to the vehicle's computer without the use of additional and costly control switches or in connection with keyless entry systems where personal identification codes are not provided to identify each operator.

SUMMARY OF THE PRESENT INVENTION

The system of the present invention provides such an operator identification system utilizing "dead" switches such as window actuating switches which presently have no control function until such time as a vehicle ignition is turned on and render the switches operational for controlling windows. The contacts of these switches, when not performing window controlling functions, still make or break upon their actuation and thus can be employed to provide a control signal for identifying a particular vehicle operator.

In a preferred embodiment of the invention, a vehicle operator is identified upon actuation of any one of the four window controlling switches, typically located on the driver's door prior to turning the ignition on. The switch contact closure is detected by electrical circuit means such that when the ignition is off the switch contact closures are employed for identification of a particular driver. When the ignition switch is turned on, the switch contacts perform their normal controlling functions for raising and lowering the windows. Thus, the system of the present invention includes means for sensing the closure state of a plurality of switches employed for common vehicle functions such as window controls, means for comparing the detected closure state with the state of activation of the ignition switch, and means for storing a personal identification code associated with a particular switch closure when the vehicle ignition switch is deactivated which can be employed for controlling selected options based upon the personal identification code for the particular driver identified.

In the preferred embodiment of the invention, a microprocessor and interface circuit means provides these control functions with the microprocessor including a subroutine for testing the "dead" switch contact closure status and comparing them against the closure status of the ignition switch to determine whether the switches are providing operator identification information or control information for their normal function. With such a system, therefore, switches such as power window control switches can provide dual functions depending upon the activation of the ignition switch and therefore eliminate the need for additional personal identification switches. These and other features, objects and advantages of the present invention will become apparent upon reading the following description thereof together with reference to the accompanying drawings in which:

DETAILED DESCRIPTION OF THE PREFERRED EMBODIMENT

Figure 1:
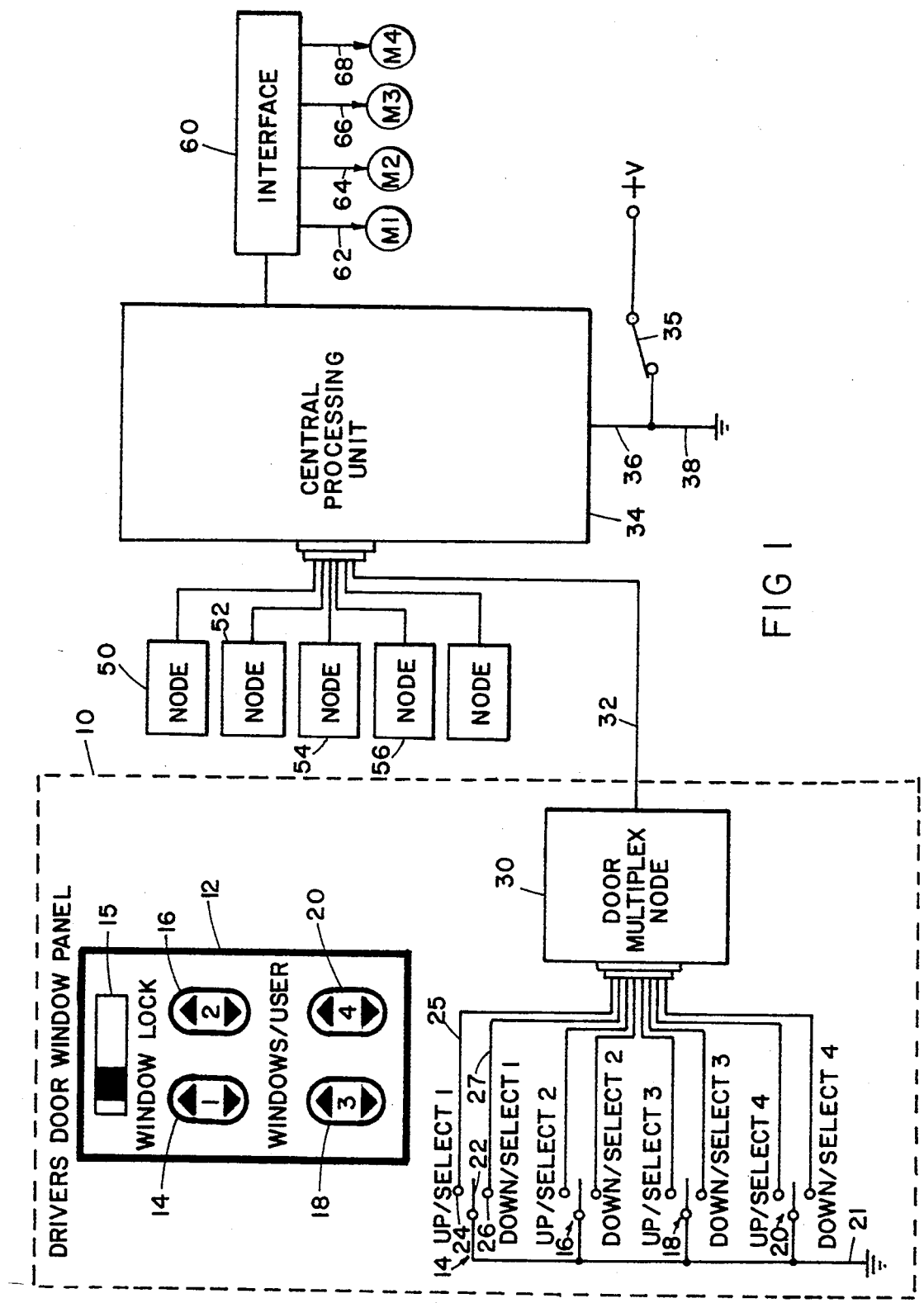
FIG. 1 is an electrical circuit diagram in block and schematic form of the system of the present invention and includes an illustration of a driver's side door switch panel.

Referring initially to FIG. 1, there is shown in schematic form, a driver's side door panel 10 for a vehicle such as an automobile. Panel 10 is represented by the dashed lines surrounding a switch control panel 12 including four single-pole, double-throw switches 14, 16, 18 and 20 mounted within panel 12 and normally employed for controlling electrically driven windows for upward or downward movement. Panel 12 may also include a window lock switch 15 such that rear seat passengers such as children cannot operate the rear seat windows which are then controlled only by the vehicle operator using switches 18 and 20. Thus, switch 14 will control the driver's window in an upward or downward direction, switch 16 will similarly control the front passenger side window, switch 18 will control the rear passenger window located behind the driver, and switch 20 will control the rear passenger side window located behind the front passenger. Panel 12 may be located integrally within an armrest mounted to the side of door panel 10 in a conventional manner or can be located in other areas such as a center console.

Each of the switches 14, 16, 18 and 20 include a movable contact 22 for engaging an up-direction contact 24 or a down-direction contact 26. Contacts 24 and 26 are coupled to conductors 25 and 27 respectively while movable contact 22 is coupled to a common ground conductor 21 which extends to system ground as shown schematically in FIG. 1. Ground conductor 21 is common to each of the switches 14, 16, 18 and 20.

Conductors 25 and 27 extend to input terminals of a door multiplex module or multiplexer 30 which includes a multiplexing chip having a plurality of input terminals with two unique input terminals associated with and coupled to the fixed contacts of each of the switches 14, 16, 18 and 20 by conductor pairs 25 and 27 coupled to each switch as shown in FIG. 1. The multiplexer 30 includes a serial data output conductor pair 32 which is coupled to a data input of a central processing unit 34 associated with the vehicle's overall electrical control system. The multiplexer 30 includes a multiplexer chip which provides time division multiplexing and sampling of each of the switch conductors associated with each of the four switches. Thus, it sequentially samples each of the conductors 25, 27 and the corresponding conductors of switches 16, 18 and 20 to determine whether or not there is a current path to ground through the switch contacts. The multiplexer 30 will then provide a signal output on differential conductor pair 32 which identifies any of each of the eight possible ground contacts which may have been made by the four two position switches as well as the window lock switch 15 (not shown in the electrical schematic diagram of FIG. 1). This provides a control or identification signal to the central processing unit 34 which identifies that a particular switch has been activated and in which direction the switch has been activated.

Figure 2:
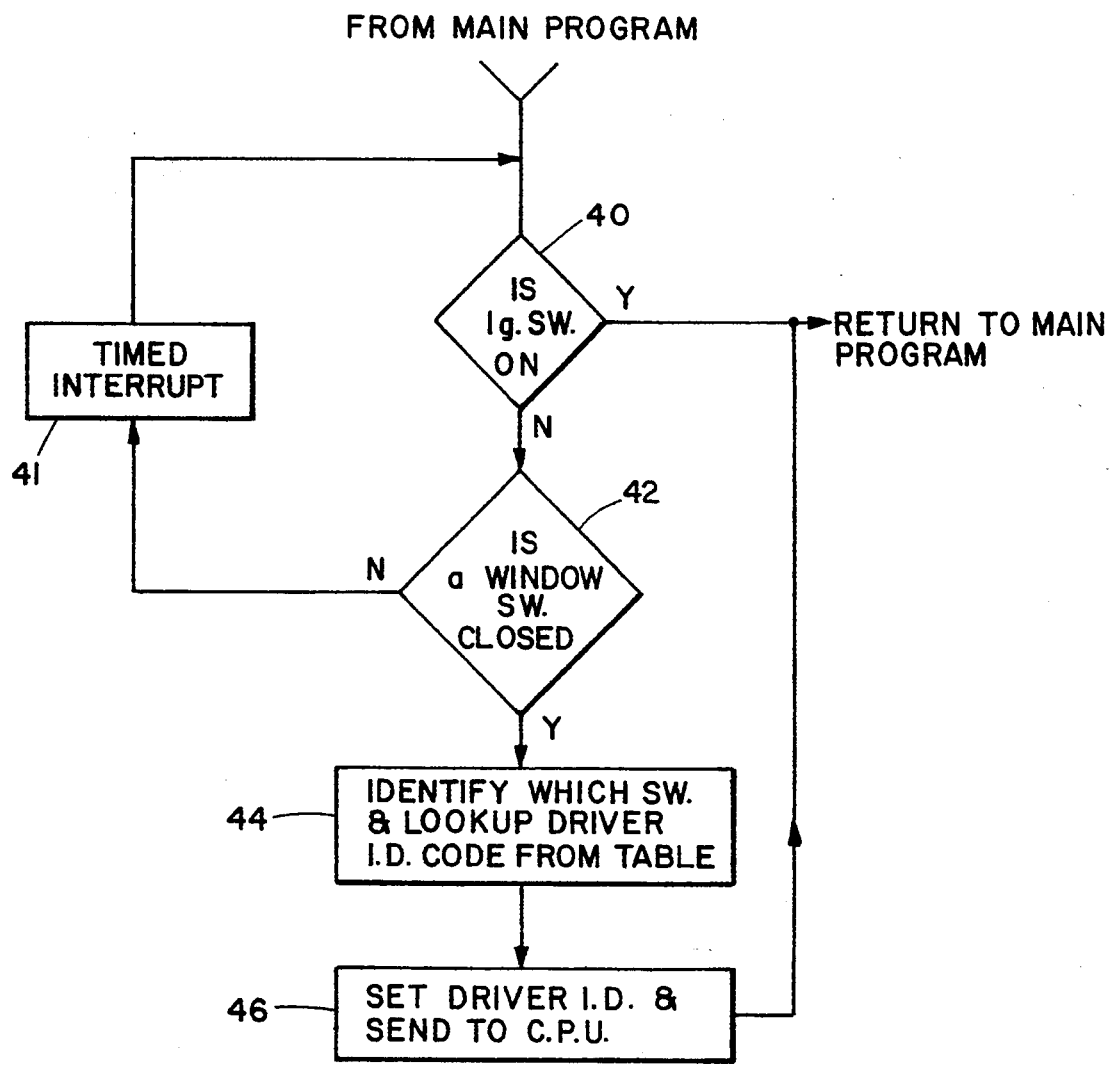
FIG. 2 is a flow diagram of a subroutine employed by the microcontroller shown in FIG. 1 for providing the testing and controlling functions of the system of the present invention.

The multiplexer 30 detects switch contact closures during both times when the ignition is turned on as well as when the ignition is turned off. Typically in vehicles, when the ignition is turned off, power window switches are not active and are considered "dead" switches since their activation provides no controlling function until such time as the ignition switch is activated. When the ignition switch is turned on, the power window control switches operate to control windows in a normal fashion. The programming of the central processing unit includes a subroutine as shown in FIG. 2 to the main program which is disclosed in greater detail in U.S. Pat. No. 5,113,182 issued on May 12, 1992, and entitled VEHICLE DOOR LOCKING SYSTEM DETECTING THAT ALL DOORS ARE CLOSED, the disclosure of which is incorporated herein by reference. The multiplexing technique employed by the multiplexer 30 and its interconnection with microprocessor 34 is conventional and a multiplexer chip such as a Harris CDP68HL6851 can be employed in circuit 30.

When the ignition switch is deactivated, on the other hand, the central processing unit 34 still monitors a variety of conditions including the receipt of a door lock or unlock signal from a keyless entry transmitter and also looks at the status of the contact closures for switches 14, 16, 18 and 20 through the multiplexer 30. The subroutine for the utilization of the window switches to identify particular drivers and therefore options selected by the drivers is now presented in connection with FIG. 2.

At any convenient location within the main program during a cycle of operation and when the ignition is turned off, a test is run as indicated by block 40 to determine whether the ignition switch is on or off. If the ignition switch is in an activated state, the program returns to the main program for conducting normal electrical control functions such as determining whether or not the vehicle operator has activated certain control switches for vehicle operation. This includes looking at switches 14, 16, 18 and 20 for controlling the movement of the vehicle windows. If the ignition switch is turned off, however, as indicated by a negative test in block 40, the subroutine determines, as indicated by block 42, whether one of the switches 14, 16, 18 or 20 has been closed by testing the conductive state on conductors 25 and 27 associated with switch 14 and the corresponding conductors associated with the remaining switches. If a conductive path to ground is detected by the multiplexer 30 and microprocessor 34, as indicated by an affirmative decision in block 42, the program then identifies which of the eight conductors has been activated through the contact closure information provided by the multiplex circuit 30. Each of four vehicle operators can have two switch contacts such that for a driver 1, the activation of switch 14, in either an up or down position provides an identification signal to the microcontroller indicating driver 1 has entered the vehicle. Having identified the particular switch contact which is activated (i.e. closed), the program goes to a look-up table to determine which driver has been assigned the particular switch and provides a driver identification code corresponding to the identified switch closure as indicated by block 44. Next, the identified driver's identification code is set into the main program as indicated by block 46 to control preset vehicle options for the particular identified driver as discussed in greater detail in the above identified U.S. Pat. No. 5,113,182. The program then returns to the main program and cycles through the main program loop including the subroutine shown in FIG. 2.

If the ignition switch is off, as indicated by a negative test in block 40 and none of the switch contacts are closed as indicated by a negative test in block 42, the subroutine continues through the testing of the switch closures to determine whether or not a switch control is activated. This loop will include a timer to interrupt the periodic checks in a conventional manner such that the program returns to the main program for periodic checks for other information which is relevant when the ignition is off such as the receipt of a keyless lock controlling signal. This interrupt timer is shown as block 41 of FIG. 2.

As seen in FIG. 1, the central processing unit 34 communicates with a variety of input nodes 50, 52, 54, 56 and 58. These nodes may include, for example, seat position controls for any number of seats, climate control information, radio control information and light control information for maplamps or courtesy lamps of the vehicle. These control modules each include a multiplex chip which tests, by time division multiplexing, the closure state of a variety of vehicle operated control switches and provide a serial data output signal to an associated data input of central processing unit 34 which is coupled by interface circuits represented by circuit block 60 in FIG. 1 to the various circuits and actuating members to be controlled by the various input switches. Thus, for example, for the windows controlled by switches 14, 16, 18 and 20, interface circuit 60 will include outputs 62, 64, 66 and 68 coupled to motors M1, M2, M3 and M4, respectively, for controlling the motors for the four windows controlled by switches 14, 16, 18 and 20 when the switches are in the window controlling position with the ignition switch activated.

Ignition switch 35 includes an output conductor 36 coupled to an input of central processing unit 34 for providing information to the computer as to whether or not the switch is in an open or closed state. When closed, as shown in FIG. 1, the +V from the vehicle battery supply provides a logic "1" signal to the central processing unit which provides a "yes" decision on subroutine test block 40. The ignition switch is conventionally coupled by conductor 38 to a variety of other vehicle circuits for providing activating power thereto when the ignition switch is turned on. For such purpose, the central processing unit 34 may provide the enable control signal while the actual power is applied to a vehicle accessory via conductor 38. Thus, with the system of the present invention, by detecting when the ignition switch is "on" or "off" switches which are usually active only when the ignition is "on" can be used for the dual purpose of providing driver identification. With the four window switches shown, up to eight drivers can be uniquely identified to the vehicle computer.

It will become apparent to those skilled in the art that various modifications to the preferred embodiments of the invention disclosed herein can be made without departing from the spirit or scope thereof as defined by the appended claims.

The embodiments of the invention in which an exclusive property or privilege is claimed are defined as follows.

1. An operator identification system by which different operators of a vehicle such as an automobile can identify themselves to a central processing unit for the vehicle comprising:
   a source of operating power;
   a vehicle ignition switch coupled to said source for selectively applying power for the ignition of a vehicle and for a plurality of accessory control switches;
   a plurality of control switches which are activated only upon the closure of said vehicle ignition switch for applying power from said source for controlling vehicle accessories; and
   circuit means for comparing the closure state of each of said plurality of switches and the closure state of said ignition switch and providing an operator identification signal when one of said plurality of said switches assigned to a particular operator is activated and said ignition switch is in an open position, said circuit means including a central processing unit including stored operator accessory preference data for responding to said operator identification signal to control vehicle accessories according to the stored preference data.

2. The system as defined in claim 1 wherein said accessory control switches comprise window control switches.

3. The system as defined in claim 1 wherein said circuit means includes a multiplexer for coupling said control switches to said central processing unit.

4. The system as defined in claim 3 wherein said accessory control switches comprise window control switches.

5. The system as defined in claim 4 wherein said window control switches are mounted to the driver door panel of a vehicle for easy access upon entering the vehicle.

6. A system for employing inactive electrical switches to provide signals for identifying a vehicle operator to a vehicle computer comprising:
   a source of operating power;
   a vehicle power switch coupled to said source for applying power to a plurality of vehicle accessory control switches;
   means for providing a first electrical signal representative of the activation state of said vehicle power switch;
   a plurality of accessory control switches coupled to said power switch for selectively providing power to vehicle accessories to which said control switches are coupled when said power switch is in a closed state for controlling vehicle accessories; and
   circuit means for comparing the closure state of each of said plurality of switches and said first electrical signal and providing an operator identification signal when one of said plurality of said switches associated with a particular operator is activated and only when said first control signal indicates that said power switch is in an open state, wherein said circuit means includes a central processing unit including memory means storing operator preference data for vehicle accessory controls for at least one operator, and wherein said circuit means responds to the receipt of said operator identification signal to control vehicle accessories according to the stored preference data for the identified operator.

7. The system as defined in claim 6 wherein said power switch comprises the ignition switch.

8. The system as defined in claim 7 wherein said accessory control switches comprise window control switches.

9. The system as defined in claim 8 wherein said circuit means includes a multiplexer for coupling said control switches to said central processing unit.

10. The system as defined in claim 6 wherein said accessory control switches comprise window control switches.

11. The system as defined in claim 10 wherein said window control switches are mounted to the driver door panel of a vehicle for easy access upon entering the vehicle.

12. A dead switch operator identification system by which different operators of a vehicle such as an automobile can identify themselves to a central processing unit for the vehicle by using switches which are inactive for use in their normal controlling function comprising:
   a source of operating power;
   a vehicle ignition switch coupled to said source for selectively applying power for the ignition of a vehicle and for controlling power applied to a plurality of power window control switches;
   a plurality of power window control switches which are activated upon the closure of said vehicle ignition switch for selectively controlling vehicle widows, wherein each of said power window control switches is associated with at least one vehicle operator; and
   circuit means for comparing the closure state of each said plurality of power window control switches and the closure state of said ignition switch and providing an operator identification signal when one of said plurality of said window switches associated with a particular operator is activated and only when said ignition switch is open, said circuit means including a central processing unit including stored operator accessory preference data for responding to said operator identification signal to control vehicle accessories according to the stored preference data.

13. The system as defined in claim 12 wherein said circuit means includes a multiplexer for coupling said window control switches to said central processing unit.

14. The system as defined in claim 13 wherein said window control switches are mounted to the driver door panel of a vehicle for easy access upon entering the vehicle.

* * * * *